United States Patent
Sakoda et al.

(10) Patent No.: US 10,895,935 B2
(45) Date of Patent: Jan. 19, 2021

(54) TOUCH PANEL DEVICE, TOUCH PANEL DEVICE CONTROL METHOD, PROGRAM, AND STORAGE MEDIUM STORING THE PROGRAM

(71) Applicant: FANUC CORPORATION, Yamanashi (JP)

(72) Inventors: Yasumichi Sakoda, Yamanashi-ken (JP); Hiroyuki Kataya, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/656,645

(22) Filed: Oct. 18, 2019

(65) Prior Publication Data

US 2020/0125231 A1   Apr. 23, 2020

(30) Foreign Application Priority Data

Oct. 23, 2018   (JP) .................................. 2018-199021

(51) Int. Cl.
*G06F 3/041* (2006.01)
*G06F 3/044* (2006.01)

(52) U.S. Cl.
CPC ........ *G06F 3/04182* (2019.05); *G06F 3/0446* (2019.05); *G06F 3/04166* (2019.05)

(58) Field of Classification Search
CPC ............... G06F 3/04166; G06F 3/0446; G06F 3/04182; G06F 3/044
See application file for complete search history.

(56) References Cited

U.S. PATENT DOCUMENTS

| | | |
|---|---|---|
| 9,411,928 B2 | 8/2016 | Karpin |
| 2015/0220170 A1* | 8/2015 | Nam ....................... G06F 3/041 345/173 |

(Continued)

FOREIGN PATENT DOCUMENTS

| | | |
|---|---|---|
| CN | 102945110 A | 2/2013 |
| CN | 203773517 U | 8/2014 |

(Continued)

OTHER PUBLICATIONS

Decision to Grant a Patent issued by the Japanese Patent Office in relation to Japanese Application No. 2018-199021 dated Jul. 7, 2020 (3 pages) along with English language translation (2 pages).

*Primary Examiner* — Dennis P Joseph
(74) *Attorney, Agent, or Firm* — Robert P. Michal, Esq.; Carter, DeLuca & Farrell LLP

(57) ABSTRACT

A touch panel device includes: a switching unit configured to switch between a first state where first electrodes operate as drive electrodes and second electrodes operate as sense electrodes and a second state where the second electrodes operate as drive electrodes and the first electrodes operate as sense electrodes; and an operation position obtaining unit configured to, if the sense signals are not determined to contain noise, obtain as an operation position touched by an operating member, a section whose signal strength in the first state is a first threshold or more, and if the sense signals are determined to contain noise, obtain as the operation position by the operating member, one section whose signal strength in the first state is the first threshold or more and the signal strength in the second state is the first threshold or more.

5 Claims, 6 Drawing Sheets

(56) References Cited

U.S. PATENT DOCUMENTS

2016/0357327 A1* 12/2016 Chang ................... G06F 3/044
2016/0378221 A1* 12/2016 Solven ................. G06F 3/0416
                                                                                                                345/174

FOREIGN PATENT DOCUMENTS

| CN | 104035635 A | 9/2014 |
| CN | 104636004 A | 5/2015 |
| CN | 105739795 A | 7/2016 |
| CN | 107272974 A | 10/2017 |
| JP | 2011210016 A | 10/2011 |
| JP | 2013114326 A | 6/2013 |
| JP | 2014-182471 A | 9/2014 |
| WO | 2018053700 A1 | 3/2018 |

* cited by examiner

TOUCH PANEL DEVICE, TOUCH PANEL DEVICE CONTROL METHOD, PROGRAM, AND STORAGE MEDIUM STORING THE PROGRAM

CROSS-REFERENCE TO RELATED APPLICATION

This application is based upon and claims the benefit of priority from Japanese Patent Application No. 2018-199021 filed on Oct. 23, 2018, the contents of which are incorporated herein by reference.

BACKGROUND OF THE INVENTION

Field of the Invention

The present invention relates to a touch panel device having a touch panel configured to output signals corresponding to positions touched by an operating member, a method for controlling the touch panel device, a program, and a storage medium storing the program.

Description of the Related Art

Japanese Laid-Open Patent Publication No. 2014-182471 discloses a technique to provide control to switch, with a given timing, between a state in which each X-axis electrode operates as a drive electrode and each Y-axis electrode operates as a sense electrode and a state in which each X-axis electrode operates as a sense electrode and each Y-axis electrode operates as a drive electrode.

SUMMARY OF THE INVENTION

According to the technique disclosed in Japanese Laid-Open Patent Publication No. 2014-182471, the lateral location of a fingertip placed on the touch surface is detected from sense voltage from the X-electrode pattern in which electrodes are arranged in multiple lines and the longitudinal location of the fingertip placed on the touch surface is detected from sense voltage from the Y-electrode pattern in which electrodes are arranged in multiple lines, which may deteriorate responsiveness of the touch panel device to operation disadvantageously.

The present invention has been devised in order to solve the problem above, and an object of the present invention is to provide a touch panel device capable of improving responsiveness to operation performed with an operating member, a method for controlling the touch panel device, a program, and a storage medium storing the program.

According to a first aspect of the present invention, there is provided a touch panel device having a touch panel including first electrodes arranged in multiple lines and extending in a first direction and second electrodes arranged in multiple lines and extending in a second direction orthogonal to the first direction. The touch panel device includes: a driving unit configured to send drive pulse signals to either one of the first electrodes and the second electrodes that operate as drive electrodes; a receiving unit configured to receive a sense signal from each of the lines that are sensed by the other of the first electrodes and the second electrodes that operate as sense electrodes; a switching unit configured to switch between a first state in which the first electrodes are connected to the driving unit as the drive electrodes and the second electrodes are connected to the receiving unit as the sense electrodes, and a second state in which the second electrodes are connected to the driving unit as the drive electrodes and the first electrodes are connected to the receiving unit as the sense electrodes; a driving control unit configured to control the driving unit to send the drive pulse signals having a set frequency sequentially to the plurality of drive electrodes; a signal strength obtaining unit, wherein, with the touch panel having a top surface divided into a matrix of sections, the signal strength obtaining unit is configured to specify one of the sections based on a combination of a line of the drive electrodes to which the driving unit has sent the drive pulse signal and a line of the sense electrodes from which the receiving unit has received the sense signal and to obtain a strength of the sense signal received by the receiving unit as a signal strength of the specified section; a noise determination unit configured to determine whether the sense signals of the sense electrodes contain noise; a switching control unit configured to control the switching unit to switch between the first state and the second state when the sense signals are determined to contain noise; and an operation position obtaining unit configured to, if the sense signals are not determined to contain noise, obtain as an operation position touched by an operating member, one of the sections whose signal strength in the first state is equal to or greater than a first threshold value, and if the sense signals are determined to contain noise, obtain as the operation position touched by the operating member, one of the sections whose signal strength in the first state is equal to or greater than the first threshold value and the signal strength in the second state is equal to or greater than the first threshold value.

According to a second aspect of the present invention, there is provided a method of controlling a touch panel device having a touch panel including first electrodes arranged in multiple lines and extending in a first direction and second electrodes arranged in multiple lines and extending in a second direction orthogonal to the first direction. The touch panel device includes: a driving unit configured to send drive pulse signals to either one of the first electrodes and the second electrodes that operate as drive electrodes; a receiving unit configured to receive a sense signal from each of the lines that are sensed by the other of the first electrodes and the second electrodes that operate as sense electrodes; and a switching unit configured to switch between a first state in which the first electrodes are connected to the driving unit as the drive electrodes and the second electrodes are connected to the receiving unit as the sense electrodes, and a second state in which the second electrodes are connected to the driving unit as the drive electrodes and the first electrodes are connected to the receiving unit as the sense electrodes. The touch panel device control method includes: a driving control step of controlling the driving unit to send the drive pulse signals having a set frequency sequentially to the plurality of drive electrodes; a signal strength obtaining step of, with the touch panel having a top surface divided into a matrix of sections, specifying one of the sections based on a combination of a line of the drive electrodes to which the driving unit has sent the drive pulse signal and a line of the sense electrodes from which the receiving unit has received the sense signal and obtaining a strength of the sense signal received by the receiving unit as a signal strength of the specified section; a noise determination step of determining whether the sense signals of the sense electrodes contain noise; a switching control step of controlling the switching unit to switch between the first state and the second state when the sense signals are determined to contain noise; and an operation position obtaining step of, if the sense signals are not determined to contain noise, obtaining as an operation position touched by an operating member, one of the sections whose signal strength in the first state is equal to or greater than a first threshold value, and if the sense signals are determined to contain noise, obtaining as the operation position touched by the operating member, one of the sections whose signal strength in the first state is equal to or greater than the first threshold value and whose signal strength in the second state is equal to or greater than the first threshold value.

According to a third aspect of the present invention, there is provided a program configured to cause a computer to execute the touch panel device control method according to the second aspect.

According to a fourth aspect of the present invention, there is provided a storage medium having stored therein a program configured to cause a computer to execute the touch panel device control method according to the second aspect.

According to the present invention, it is possible to improve responsiveness to operation performed with an operating member.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

First Embodiment

[Configuration of Touch Panel Device]

Figure 1:
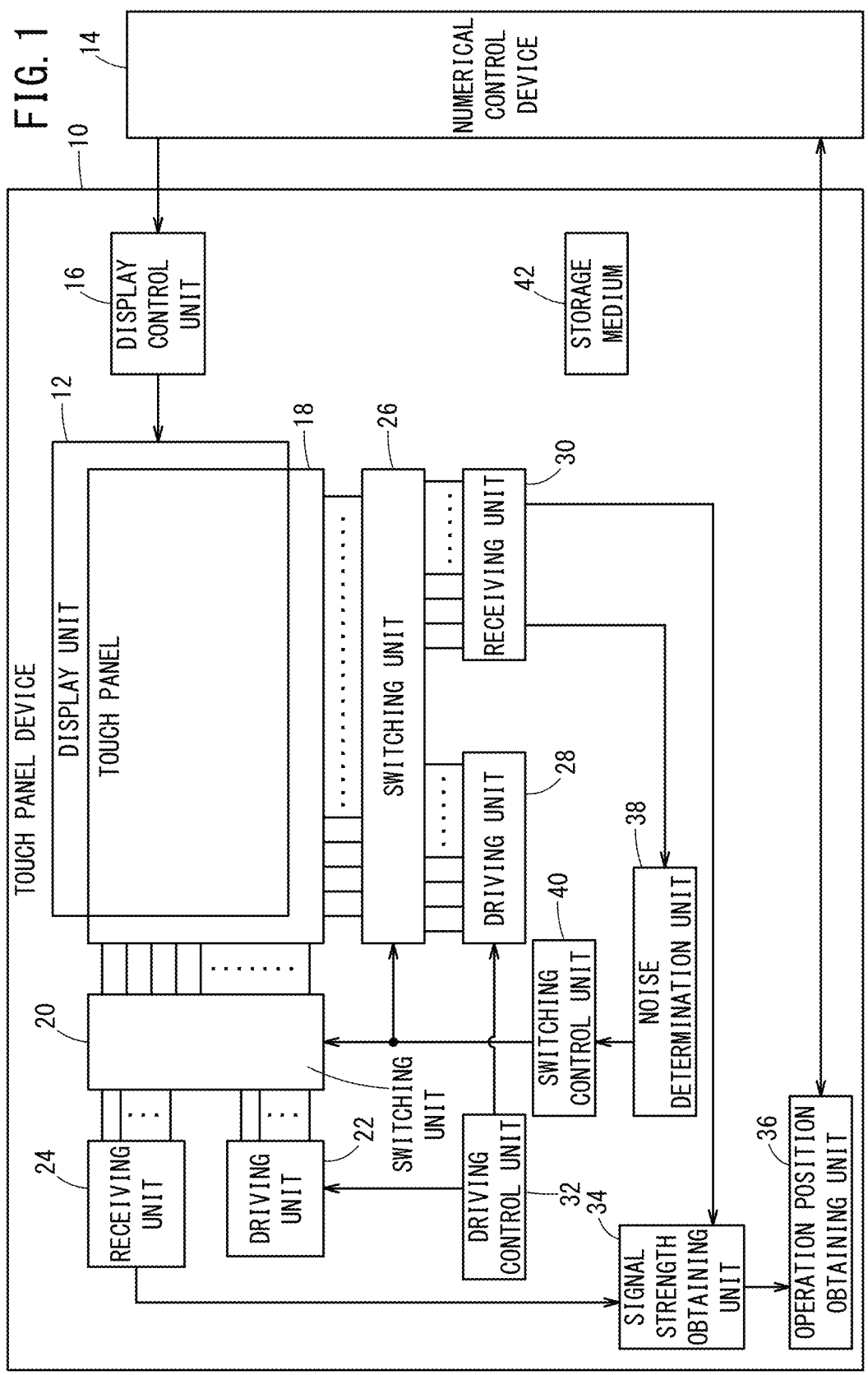
FIG. 1 is a block diagram showing the configuration of a touch panel device.

FIG. 1 is a block diagram showing the configuration of a touch panel device 10. The touch panel device 10 is an input device that allows a user to perform an operation by touching a screen of a display unit 12 where images etc. are displayed, by using an operating member such as a finger, stylus, etc. The touch panel device 10 of this embodiment is used as an input device for a numerical control device 14 for controlling a machine tool not shown.

The touch panel device 10 includes the display unit 12, a display control unit 16, a touch panel 18, a first switching unit 20, a first driving unit 22, a first receiving unit 24, a second switching unit 26, a second driving unit 28, a second receiving unit 30, a driving control unit 32, a signal strength obtaining unit 34, an operation position obtaining unit 36, a noise determination unit 38, and a switching control unit 40.

The display unit 12 can be a liquid-crystal display, for example, which displays icons through which a user can enter commands into the numerical control device 14, information indicating conditions of the machine tool sent from the numerical control device 14, and so on. The display control unit 16 controls the display unit 12 according to requests from the numerical control device 14.

The touch panel 18 is a transparent film member put on the screen of the display unit 12. The touch panel 18 of this embodiment is a mutual capacitance touch panel.

Figure 2:
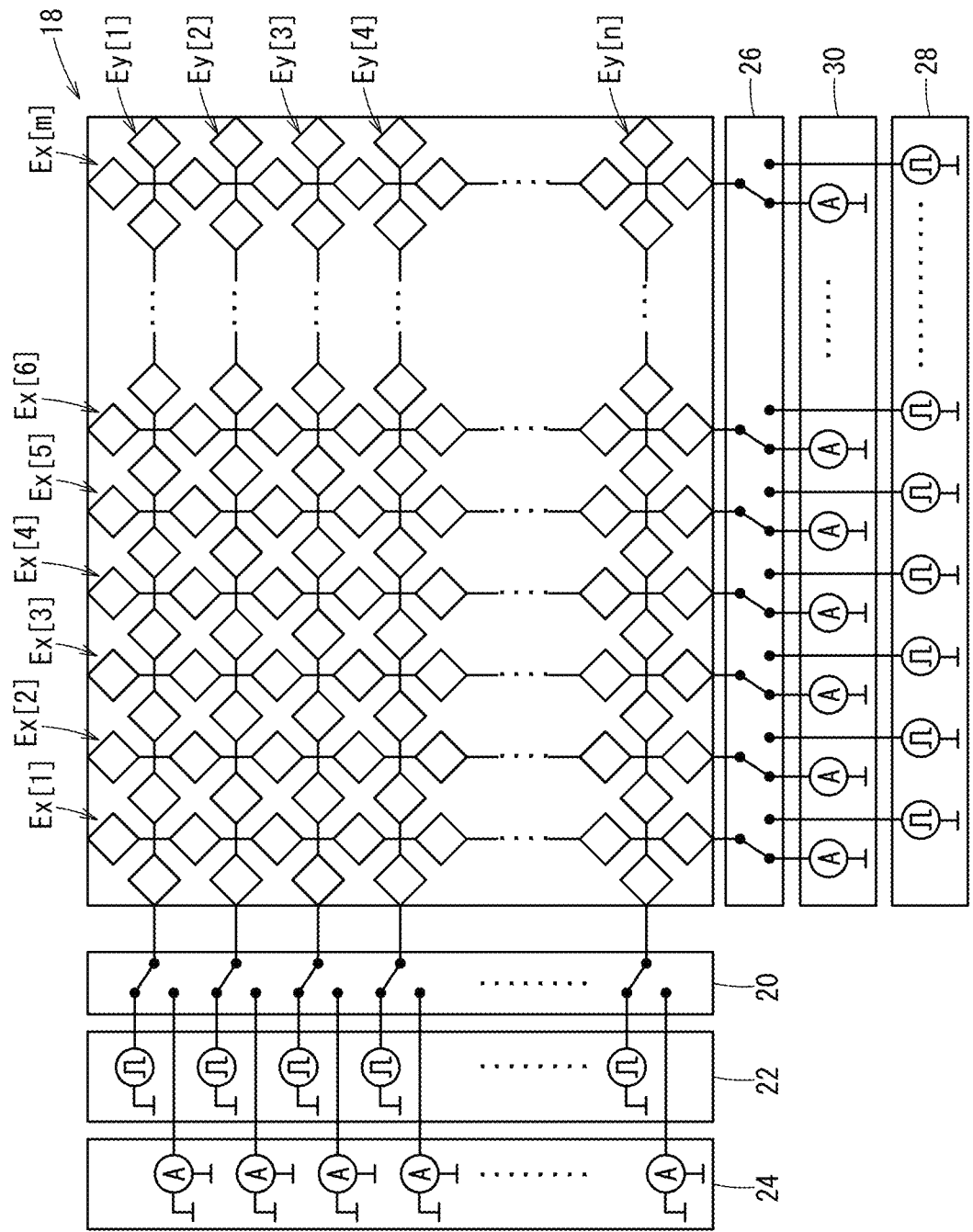
FIG. 2 is a schematic diagram showing the configuration of a touch panel.

FIG. 2 is a schematic diagram showing a structure of the touch panel 18. The touch panel 18 includes X-axis electrodes Ex[1] to Ex[m] and Y-axis electrodes Ey[1] to Ey[n] made of indium tin oxide. The X-axis electrodes Ex[1] to Ex[m] each extend in the Y-axis direction in FIG. 2, and the electrodes Ex[1] to Ex[m] are arranged in the X-axis direction to form m-lines of electrodes. The Y-axis electrodes Ey[1] to Ey[n] each extend in the X-axis direction in FIG. 2, and the electrodes Ey[1] to Ey[n] are arranged in the Y-axis direction to form n-lines of electrodes.

The first driving unit 22 and the first receiving unit 24 are connected to the Y-axis electrodes Ey[1] to Ey[n] through the first switching unit 20. The second receiving unit 30 and the second driving unit 28 are connected to the X-axis electrodes Ex[1] to Ex[m] through the second switching unit 26.

The first switching unit 20 switches between a first state in which the Y-axis electrodes Ey[1] to Ey[n] are connected to the first driving unit 22 and a second state in which the Y-axis electrodes Ey[1] to Ey[n] are connected to the first receiving unit 24. In the first state, the Y-axis electrodes Ey[1] to Ey[n] operate as drive electrodes, while in the second state the Y-axis electrodes Ey[1] to Ey[n] operate as sense electrodes.

The second switching unit 26 switches between the first state in which the X-axis electrodes Ex[1] to Ex[m] are connected to the second receiving unit 30 and the second state in which the X-axis electrodes Ex[1] to Ex[m] are connected to the second driving unit 28. In the first state, the X-axis electrodes Ex[1] to Ex[m] operate as sense electrodes, while in the second state the X-axis electrodes Ex[1] to Ex[m] operate as drive electrodes.

Figure 3:
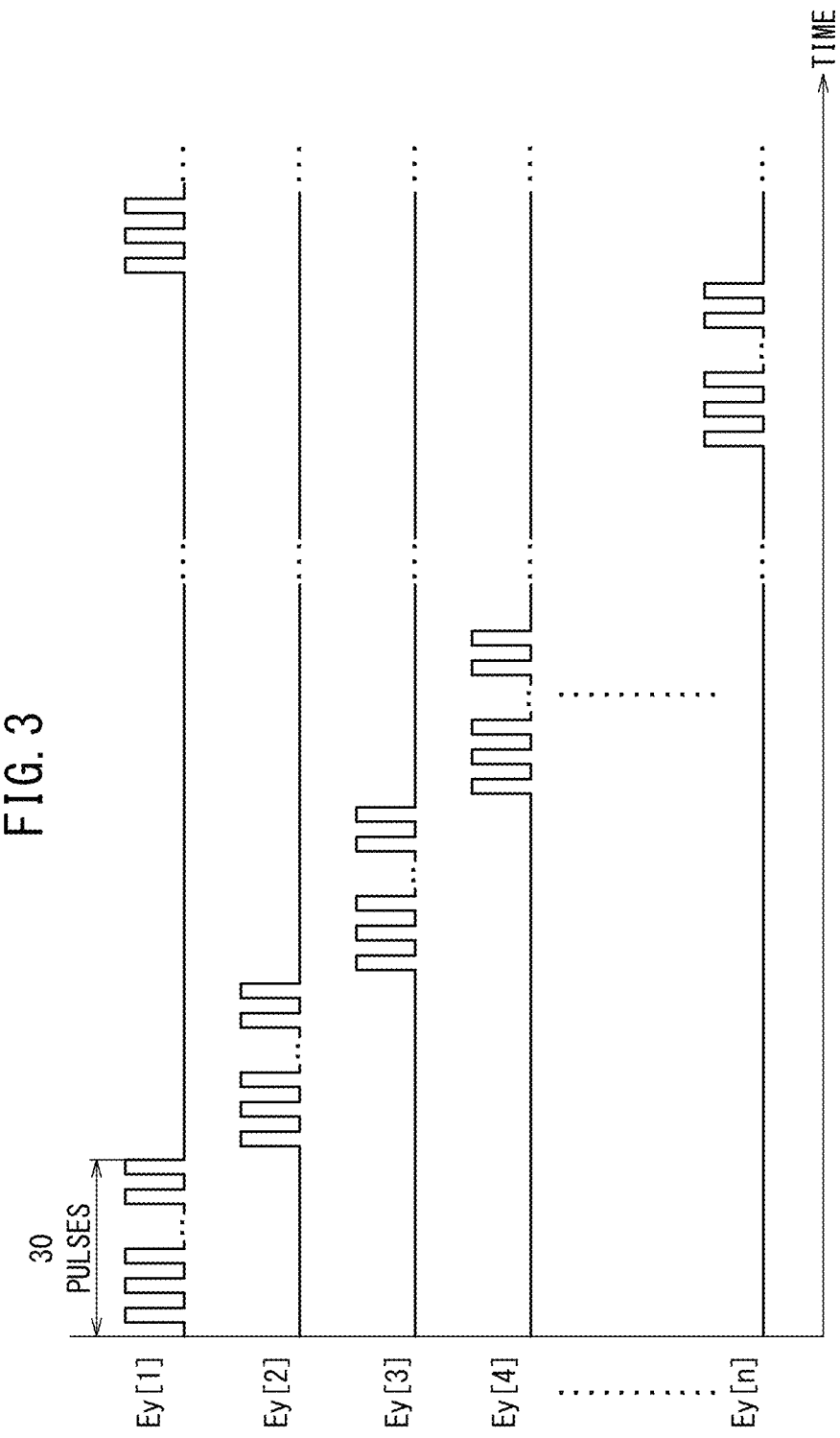
FIG. 3 is a graph showing drive pulse signals that are inputted respectively to Y-axis electrodes from a first driving unit.

In the first state, the first driving unit 22 sends drive pulse signals respectively to the Y-axis electrodes Ey[1] to Ey[n]. FIG. 3 is a graph showing the drive pulse signals inputted from the first driving unit 22 respectively to the Y-axis electrodes Ey[1] to Ey[n]. The first driving unit 22 sends drive pulse signal of 30 pulses having a preset frequency sequentially to the Y-axis electrodes Ey[1] to Ey[n]. The number of pulses of the drive pulse signal is not limited to 30 pulses. In the second state, the second driving unit 28 sends the drive pulse signals respectively to the X-axis electrodes Ex[1] to Ex[m] in the same way.

In the first state, the second receiving unit 30 receives sense signals respectively from the X-axis electrodes Ex[1] to Ex[m]. The second receiving unit 30 senses current flowing from the Y-axis electrodes Ey[1] to Ey[n] to the X-axis electrodes Ex[1] to Ex[m] and converts the sensed current into voltage. When no operating member is in contact with the touch panel 18 and no effect of noise exists, the voltage amplitude of the X-axis electrodes Ex[1] to Ex[m] is V0. When an operating member touches the touch panel 18, part of the current flowing from the Y-axis electrodes Ey[1] to Ey[n] to the X-axis electrodes Ex[1] to Ex[m] flows toward the operating member and thereby the voltage amplitude of the X-axis electrodes Ex[1] to Ex[m] becomes smaller than V0. The second receiving unit 30 calculates the sense signal by using a difference |V0−V| between the voltage V0 and the amplitude V of the sensed voltage. The second receiving unit 30 recognizes a touch to a certain position on the screen with the operating member if the strength of the sense signal is equal to or greater than a threshold value. In the second state, the first receiving unit 24 receives sense signals respectively from the Y-axis electrodes Ey[1] to Ey[n] in the same way.

Hereinafter, the X-axis electrodes Ex[1] to Ex[m] may be collectively referred to as X-axis electrodes Ex when it is not necessary to distinguish the lines thereof. Also, hereinafter, the Y-axis electrodes Ey[1] to Ey[n] may be collectively referred to as Y-axis electrodes Ey when it is not necessary to distinguish the lines thereof.

Returning to FIG. 1, in the first state, the driving control unit 32 controls the first driving unit 22 to repeatedly perform a scanning process in which the drive pulse signals having a set frequency are sequentially sent to the Y-axis electrodes in order from the Y-axis electrode Ey[1] to Y-axis electrode Ey[n]. In the second state, the driving control unit 32 controls the second driving unit 28 to repeatedly perform a scanning process in which the drive pulse signals having a set frequency are sequentially sent to the X-axis electrodes in order from the X-axis electrode Ex[1] to the X-axis electrode Ex[m].

Figure 4:
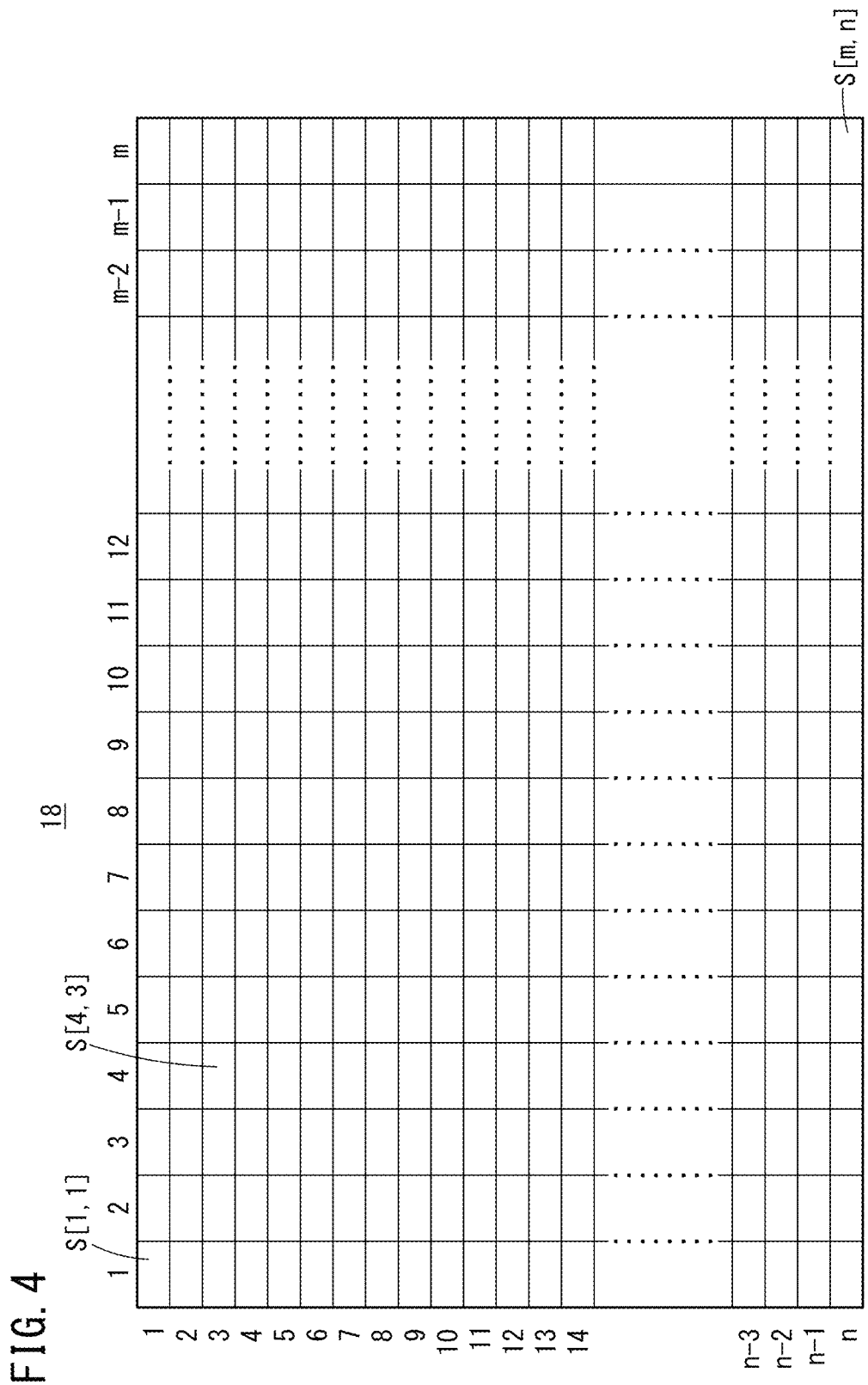
FIG. 4 is a schematic diagram showing the top surface of the touch panel sectioned into a matrix.

The signal strength obtaining unit 34 obtains a signal strength at each of sections S[1, 1] to S[m, n] formed by partitioning the touch surface of the touch panel 18 into a matrix or a grid. FIG. 4 is a schematic diagram illustrating the touch panel 18 sectioned into a matrix. FIG. 4 shows parting lines between the sections S[1, 1] to S[m, n], but the parting lines between the sections S[1, 1] to S[m, n] are not actually visible in the touch panel 18.

In the first state, the signal strength obtaining unit 34 specifies or locates a section S[1, 1] to S[m, n] corresponding to a position on the touch panel 18 which is touched by the operating member (which is hereinafter referred to as an operation position) from the combination of a line of Y-axis electrode Ey to which the first driving unit 22 has sent the drive pulse signal and a line of X-axis electrode Ex from which the second receiving unit 30 has received the sense signal. Then, the signal strength obtaining unit 34 obtains the strength of the sense signal as the signal strength of the specified section S[1, 1] to S[m, n]. For example, if the first driving unit 22 has sent the drive pulse signal to the Y-axis electrode Ey[3] and the second receiving unit 30 has received the sense signal from the X-axis electrode Ex[4], then the signal strength obtaining unit 34 specifies the section S[4, 3] as the operation position touched by the operating member. Then, the signal strength obtaining unit 34 obtains the strength of the sense signal of the X-axis electrode Ex[4] as the signal strength of the section S[4, 3]. In the second state, in the same way, the signal strength obtaining unit 34 specifies a section S[1, 1] to S[m, n] that corresponds to an operation position touched by the operating member from the combination of a line of X-axis electrode Ex to which the second driving unit 28 has sent the drive pulse signal and a line of Y-axis electrode Ey from which the first receiving unit 24 has received the sense signal. The sections S[1, 1] to S[m, n] may hereinafter be collectively referred to as sections S when it is not necessary to distinguish the sections S[1, 1] to S[m, n].

The operation position obtaining unit 36 obtains the operation position of the operating member in accordance with the signal strength at each section S obtained by the signal strength obtaining unit 34. For example, the operation position obtaining unit 36 obtains, as the operation position, the position of a section S where the signal strength is equal to or greater than a first threshold value. The acquisition of the operation position of the operating member by the operation position obtaining unit 36 will be described later in detail.

In the first state, the noise determination unit 38 determines whether noise is present in the sense signals or not based on the signal strength at each section S obtained by the signal strength obtaining unit 34. The determination made by the noise determination unit 38 as to whether noise is present will be described in detail later.

If the noise determination unit 38 determines that noise is present in a sense signal, the switching control unit 40 controls the first switching unit 20 and the second switching unit 26 to switch between the first state and the second state at a given cycle.

The driving control unit 32, the signal strength obtaining unit 34, the operation position obtaining unit 36, the noise determination unit 38, and the switching control unit 40 are realized by a computer executing a program stored in a storage medium 42.

[Noise Determination Processing]

In the first state, the noise determination unit 38 determines that the sense signals contain noise if there is any section S where the signal strength in the previous scanning process is equal to or greater than a second threshold value and the signal strength in the next scanning process is less than the second threshold value. The second threshold value is set to a value equal to or less than the first threshold value.

In the above-described operation, the noise determination unit 38 determines that the sense signal contains noise when, in two scanning processes, there is any section S where the number of times that the signal strength was equal to or greater than the second threshold value is once or more and less than twice. However, the number of times that the scanning process is carried out and the number of times that the signal strength is equal to or greater than the second threshold value may be set in an appropriate manner.

[Operation Position Obtaining Processing]

Figure 5:
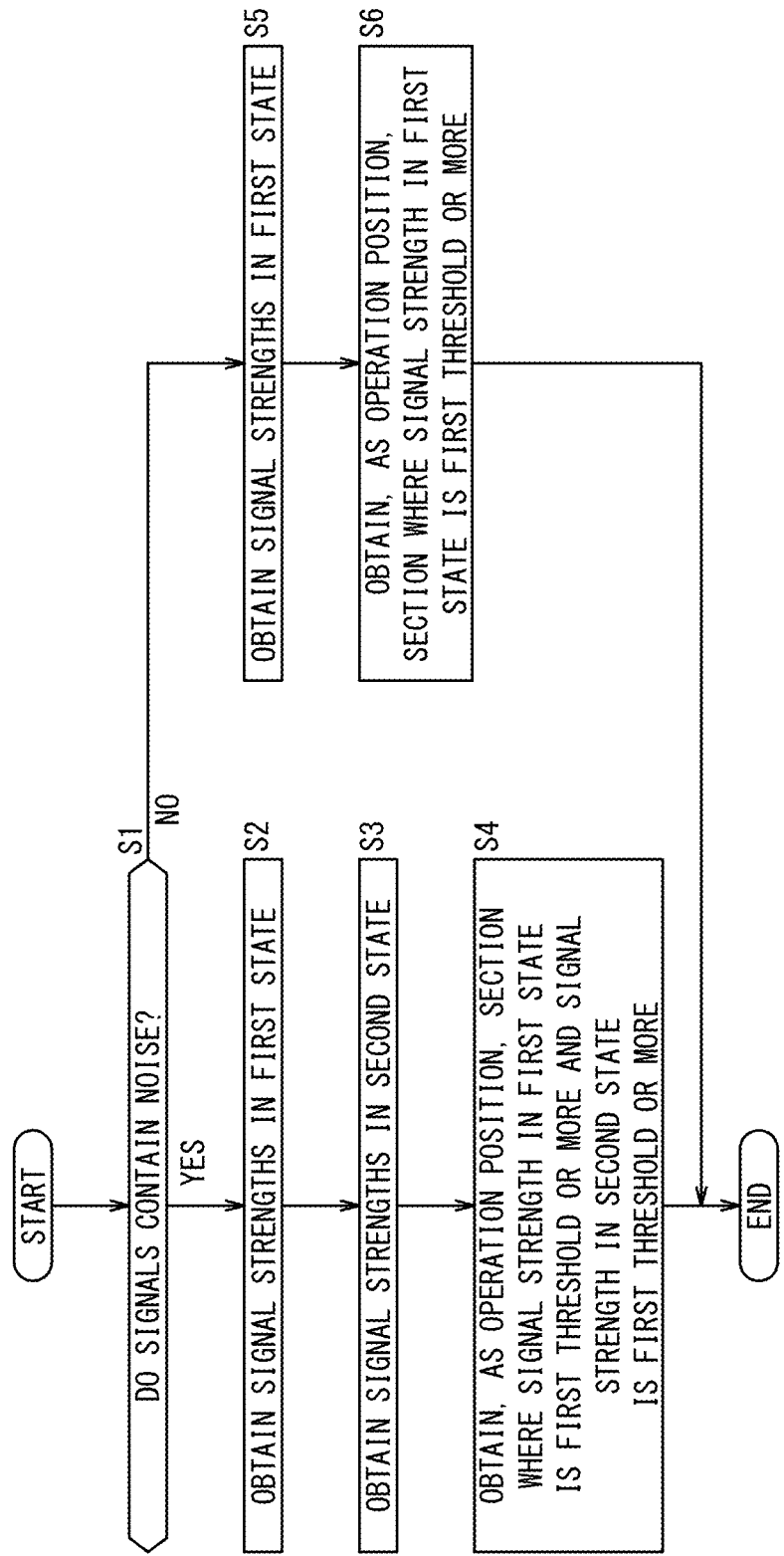
FIG. 5 is a flowchart showing the flow of an operation position obtaining process performed by an operation position obtaining unit.

FIG. 5 is a flowchart showing the flow of operation position obtaining processing performed by the operation position obtaining unit 36.

At step S1, the operation position obtaining unit 36 determines whether the sense signals contain noise. If the sense signals contain noise, the process moves to step S2. If the sense signals do not contain noise, the process moves to step S5.

At step S2, the operation position obtaining unit 36 obtains the signal strength at each section S in the first state.

At step S3, the operation position obtaining unit 36 obtains the signal strength at each section S in the second state.

At step S4, the operation position obtaining unit 36 obtains, as an operation position, a section S where the signal strength in the first state is equal to or greater than the first threshold value and the signal strength in the second state is equal to or greater than the first threshold value.

At step S5, the operation position obtaining unit 36 obtains the signal strength at each section S in the first state.

At step S6, the operation position obtaining unit 36 obtains, as an operation position, a section S where the signal strength in the first state is equal to or greater than the first threshold value, and the process is terminated.

Figure 6A:
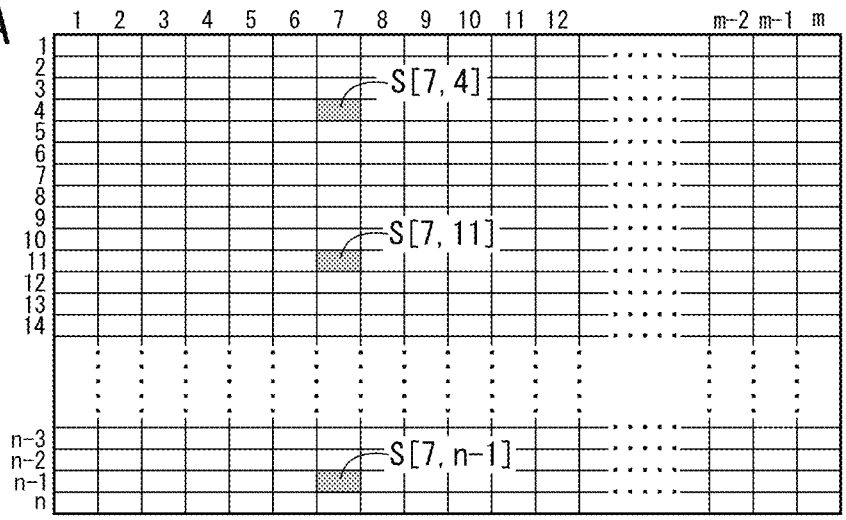
FIGS. 6A, 6B and 6C are diagrams used to explain an operation position obtaining method.
Figure 6B:
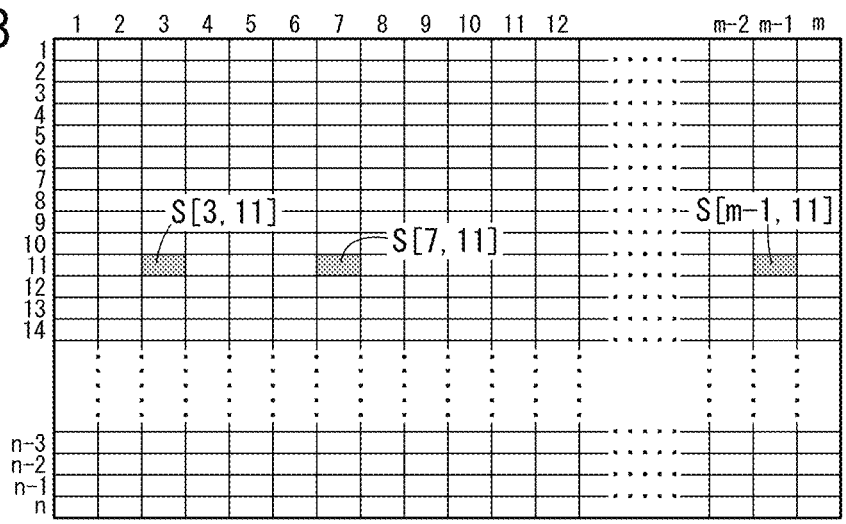
Figure 6C:
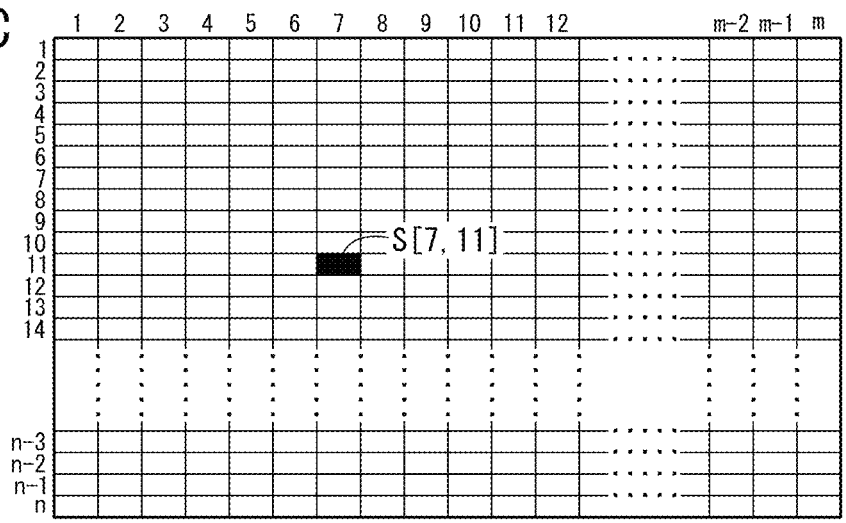

FIGS. 6A to 6C are diagrams illustrating the operation position obtaining method. FIG. 6A shows signal strength in the first state where the gray-colored sections indicate sections S whose signal strengths are equal to or greater than the first threshold value in the first state. FIG. 6B shows signal strength in the second state where the gray-colored sections S indicate sections S whose signal strengths are equal to or greater than the first threshold value.

As shown in FIG. 6A, in the first state, the signal strengths at the section S [7, 4], section S [7, 11], and section S [7, n−1] are equal to or greater than the first threshold value. Also, as shown in FIG. 6B, in the second state, the signal strengths at the section S [3, 11], section S [7, 11], and section S [m−1, 11] are equal to or greater than the first threshold value. In this case, the operation position obtaining unit 36 obtains the black-colored section S [7, 11] in FIG. 6C as the operation position.

[Functions and Effects]

Noise immunity can be improved by configuring the operation position obtaining unit 36 to obtain, as the operation position, a section S at which the signal strength is equal to or greater than the first threshold value in both of the first state in which the Y-axis electrodes Ey[1] to Ey[n] operate as drive electrodes and the X-axis electrodes Ex[1] to Ex[m] operate as sense electrodes and the second state in which the X-axis electrodes Ex[1] to Ex[m] operate as drive electrodes and the Y-axis electrodes Ey[1] to Ey[n] operate as sense electrodes. However, this may deteriorate the responsiveness of the touch panel device 10 to operation because it is necessary to perform both the scanning process for the Y-axis electrodes Ey[1] to Ey[n] and the scanning process for the X-axis electrodes Ex[1] to Ex[m].

Hence, according to the touch panel device 10 of this embodiment, when the sense signals are not determined to contain noise, the operation position obtaining unit 36 obtains the operation position touched by the operating member on the basis of the signal strength of each section S obtained in the first state. When the sense signals are determined to contain noise, then the operation position obtaining unit 36 obtains the operation position touched by the operating member on the basis of the signal strength of each section S obtained in the first state and the signal strength of each section S obtained in the second state.

In this way, it is possible to improve responsiveness of the touch panel device 10 to operation when the sense signals are not determined to contain noise, and it is also possible to improve noise immunity of the touch panel device 10 when the sense signals are determined to contain noise.

Further, according to the touch panel device 10 of this embodiment, in the case where the first driving unit 22 has performed the scanning process twice in the first state in order to send the drive pulse signals sequentially to the lines of the drive electrodes, the noise determination unit 38 is configured to determine that the sense signals contain noise if there is any section S where the number of times that the signal strength is equal to or greater than the second threshold value is once or more and less than twice. The time length for which the second receiving unit 30 receives noise is shorter than the time length for which the second receiving unit 30 receives the sense signal, when an operating member is in contact with the touch panel 18. It is therefore possible to determine that the sense signal contains noise when there is any section S where the number of times that the signal strength was equal to or greater than the second threshold value is less than a given number of times.

[Technical Ideas Obtained from Embodiments]

Technical ideas that can be grasped from the above-described embodiments will be recited below.

The touch panel device (10) has a touch panel (18) including first electrodes (Ey) arranged in multiple lines and extending in a first direction and second electrodes (Ex) arranged in multiple lines and extending in a second direction orthogonal to the first direction. The touch panel device includes: a driving unit (22, 28) configured to send drive pulse signals to either one of the first electrodes and the second electrodes that operate as drive electrodes; a receiving unit (24, 30) configured to receive a sense signal from each of the lines that are sensed by the other of the first electrodes and the second electrodes that operate as sense electrodes; a switching unit (20, 26) configured to switch between a first state in which the first electrodes are connected to the driving unit as the drive electrodes and the second electrodes are connected to the receiving unit as the sense electrodes, and a second state in which the second electrodes are connected to the driving unit as the drive electrodes and the first electrodes are connected to the receiving unit as the sense electrodes; a driving control unit (32) configured to control the driving unit to send the drive pulse signals having a set frequency sequentially to the plurality of drive electrodes; a signal strength obtaining unit (34), wherein, with the touch panel having a top surface divided into a matrix of sections, the signal strength obtaining unit is configured to specify one of the sections (S) based on a combination of a line of the drive electrodes to which the driving unit has sent the drive pulse signal and a line of the sense electrodes from which the receiving unit has received the sense signal and to obtain a strength of the sense signal received by the receiving unit as a signal strength of the specified section; a noise determination unit (38) configured to determine whether the sense signals of the sense electrodes contain noise; a switching control unit (40) configured to control the switching unit to switch between the first state and the second state when the sense signals are determined to contain noise; and an operation position obtaining unit (36) configured to, if the sense signals are not determined to contain noise, obtain, as an operation position touched by an operating member, one of the sections whose signal strength in the first state is equal to or greater than a first threshold value, and if the sense signals are determined to contain noise, obtain, as the operation position touched by the operating member, one of the sections whose signal strength in the first state is equal to or greater than the first threshold value and whose signal strength in the second state is equal to or greater than the first threshold value. Thus, it is possible to improve the responsiveness of the touch panel device to operation when the sense signals are not determined to contain noise, and it is also possible to improve the noise immunity of the touch panel device when the sense signals are determined to contain noise.

In the touch panel device above, when the driving unit has performed multiple times in the first state a scanning process in which the drive pulse signals are sent sequentially to the lines of the drive electrodes, the noise determination unit may be configured to determine that the sense signals contain noise if there is any section where the number of times that the signal strength is equal to or greater than a second threshold value is once or more and less than a given number of times. Thus, the noise determination unit can determine that the sense signals contain noise in the first state.

There is provided a method of controlling a touch panel device (10) having a touch panel (18) including first electrodes (Ey) arranged in multiple lines and extending in a first direction and second electrodes (Ex) arranged in multiple lines and extending in a second direction orthogonal to the first direction. The touch panel device includes a driving unit (22, 28) configured to send drive pulse signals to either one of the first electrodes and the second electrodes that operates as drive electrodes, a receiving unit (24, 30) configured to receive a sense signal from each of the lines that are sensed by the other of the first electrodes and the second electrodes that operate as sense electrodes, and a switching unit (20, 26) configured to switch between a first state in which the first electrodes are connected to the driving unit as the drive electrodes and the second electrodes are connected to the receiving unit as the sense electrodes, and a second state in which the second electrodes are connected to the driving unit as the drive electrodes and the first electrodes are connected to the receiving unit as the sense electrodes. The touch panel device control method includes: a driving control step of controlling the driving unit to send the drive pulse signals having a set frequency sequentially to the plurality of drive electrodes; a signal strength obtaining step of, with the touch panel having a top surface divided into a matrix of sections, specifying one of the sections based on a combination of a line of the drive electrodes to which the driving unit has sent the drive pulse signal and a line of the sense electrodes from which the receiving unit has received the sense signal and obtaining a strength of the sense signal received by the receiving unit as a signal strength of the specified section; a noise determination step of determining whether the sense signals of the sense electrodes contain noise; a switching control step of controlling the switching unit to switch between the first state and the second state when the sense signals are determined to contain noise; and an operation position obtaining step of, if the sense signals are not determined to contain noise, obtaining as an operation position touched by an operating member, one of the sections whose signal strength in the first state is equal to or greater than a first threshold value, and if the sense signals are determined to contain noise, obtaining as the operation position touched by the operating member, one of the sections whose signal strength in the first state is equal to or greater than the first threshold value and whose signal strength in the second state is equal to or greater than the first threshold value. Thus, it is possible to improve the responsiveness of the touch panel device to operation when the sense signals are not determined to contain noise, and it is also possible to improve the noise immunity of the touch panel device when the sense signals are determined to contain noise.

In the touch panel device control method above, when the driving unit has performed multiple times in the first state a scanning process in which the drive pulse signals are sent sequentially to the lines of the drive electrodes, the noise determination step may determine that the sense signals contain noise if there is any section where the number of times that the signal strength is equal to or greater than a second threshold value is once or more and less than a given number of times. Thus, the noise determination step can determine that the sense signals contain noise in the first state.

There is provided a program configured to cause a computer to execute the touch panel device control method described above. Thus, it is possible to improve the responsiveness of the touch panel device to operation when the sense signals are not determined to contain noise, and it is also possible to improve the noise immunity of the touch panel device when the sense signals are determined to contain noise.

There is provided a storage medium (42) having stored therein a program configured to cause a computer to execute the touch panel device control method described above. Thus, it is possible to improve the responsiveness of the touch panel device to operation when the sense signals are not determined to contain noise, and it is also possible to improve the noise immunity of the touch panel device when the sense signals are determined to contain noise.

The present invention is not particularly limited to the embodiment described above, and various modifications are possible without departing from the essence and gist of the present invention.

What is claimed is:

1. A touch panel device having a touch panel, wherein the touch panel includes:
   first electrodes arranged in multiple lines and extending in a first direction; and
   second electrodes arranged in multiple lines and extending in a second direction orthogonal to the first direction,
   the touch panel device comprising:
   a driving unit configured to send drive pulse signals to either one of the first electrodes and the second electrodes that operate as drive electrodes;
   a receiving unit configured to receive a sense signal from each of the lines that are sensed by other of the first electrodes and the second electrodes that operate as sense electrodes;
   a switching unit configured to switch between a first state in which the first electrodes are connected to the driving unit as the drive electrodes and the second electrodes are connected to the receiving unit as the sense electrodes, and a second state in which the second electrodes are connected to the driving unit as the drive electrodes and the first electrodes are connected to the receiving unit as the sense electrodes;
   a driving control unit configured to control the driving unit to send the drive pulse signals having a set frequency sequentially to the plurality of drive electrodes;
   a signal strength obtaining unit, wherein, with the touch panel having a top surface divided into a matrix of sections, the signal strength obtaining unit is configured to specify one of the sections based on a combination of a line of the drive electrodes to which the driving unit has sent the drive pulse signal and a line of the sense electrodes from which the receiving unit has received the sense signal and to obtain a strength of the sense signal received by the receiving unit as a signal strength of the specified section;
   a noise determination unit configured to determine whether the sense signals of the sense electrodes contain noise;
   a switching control unit configured to control the switching unit to switch between the first state and the second state when the sense signals are determined to contain noise; and
   an operation position obtaining unit configured to, if the sense signals are not determined to contain noise, obtain, as an operation position touched by an operating member, one of the sections whose signal strength in the first state is equal to or greater than a first threshold value, and if the sense signals are determined to contain noise, obtain, as the operation position touched by the operating member, one of the sections whose signal strength in the first state is equal to or greater than the first threshold value and whose signal strength in the second state is equal to or greater than the first threshold value.

2. The touch panel device according to claim 1, wherein, when the driving unit has performed multiple times in the first state a scanning process in which the drive pulse signals are sent sequentially to the lines of the drive electrodes, the noise determination unit is configured to determine that the sense signals contain noise if there is any section where a number of times that the signal strength is equal to or greater than a second threshold value is once or more and less than a given number of times.

3. A method of controlling a touch panel device having a touch panel, wherein the touch panel includes:

first electrodes arranged in multiple lines and extending in a first direction; and second electrodes arranged in multiple lines and extending in a second direction orthogonal to the first direction, and the touch panel device comprises:

a driving unit configured to send drive pulse signals to either one of the first electrodes and the second electrodes that operate as drive electrodes, a receiving unit configured to receive a sense signal from each of the lines that are sensed by other of the first electrodes and the second electrodes that operate as sense electrodes, and a switching unit configured to switch between a first state in which the first electrodes are connected to the driving unit as the drive electrodes and the second electrodes are connected to the receiving unit as the sense electrodes, and a second state in which the second electrodes are connected to the driving unit as the drive electrodes and the first electrodes are connected to the receiving unit as the sense electrodes, the method comprising:

a driving control step of controlling the driving unit to send the drive pulse signals having a set frequency sequentially to the plurality of drive electrodes;

a signal strength obtaining step of, with the touch panel having a top surface divided into a matrix of sections, specifying one of the sections based on a combination of a line of the drive electrodes to which the driving unit has sent the drive pulse signal and a line of the sense electrodes from which the receiving unit has received the sense signal and obtaining a strength of the sense signal received by the receiving unit as a signal strength of the specified section;

a noise determination step of determining whether the sense signals of the sense electrodes contain noise;

a switching control step of controlling the switching unit to switch between the first state and the second state when the sense signals are determined to contain noise; and an operation position obtaining step of, if the sense signals are not determined to contain noise, obtaining as an operation position touched by an operating member, one of the sections whose signal strength in the first state is equal to or greater than a first threshold value, and if the sense signals are determined to contain noise, obtaining as the operation position touched by the operating member, one of the sections whose signal strength in the first state is equal to or greater than the first threshold value and whose signal strength in the second state is equal to or greater than the first threshold value.

4. The method of controlling the touch panel device according to claim 3, wherein, when the driving unit has performed multiple times in the first state a scanning process in which the drive pulse signals are sent sequentially to the lines of the drive electrodes, the noise determination step determines that the sense signals contain noise if there is any section where a number of times that the signal strength is equal to or greater than a second threshold value is once or more and less than a given number of times.

5. A non-transitory storage medium having stored therein a program configured to cause a computer to execute the method of controlling the touch panel device according to claim 3.

* * * * *